US008606543B2

(12) United States Patent
Naslund et al.

(10) Patent No.: US 8,606,543 B2
(45) Date of Patent: Dec. 10, 2013

(54) METHOD TO DETECT ANGLE SENSOR PERFORMANCE DEGRADATION THROUGH DITHER MONITORING

(75) Inventors: Brian B. Naslund, Chanhassen, MN (US); Jonathan R. Singleton, Burnsville, MN (US); Robert A. Combs, Deephaven, MN (US)

(73) Assignee: Rosemount Aerospace Inc., Burnsville, MN (US)

(*) Notice: Subject to any disclaimer, the term of this patent is extended or adjusted under 35 U.S.C. 154(b) by 372 days.

(21) Appl. No.: 13/090,950

(22) Filed: Apr. 20, 2011

(65) Prior Publication Data
US 2011/0270576 A1    Nov. 3, 2011

Related U.S. Application Data

(60) Provisional application No. 61/343,556, filed on Apr. 30, 2010.

(51) Int. Cl.
*G06F 15/00* (2006.01)

(52) U.S. Cl.
USPC .......................................................... 702/183

(58) Field of Classification Search
USPC .......................................................... 702/183
See application file for complete search history.

(56) References Cited

U.S. PATENT DOCUMENTS 5,947,680 A * 9/1999 Harada et al. ................... 415/17

FOREIGN PATENT DOCUMENTS

EP    0084232 A1    7/1983
EP    2141502 A1    1/2010

OTHER PUBLICATIONS

European Search Report dated Sep. 30, 2011 for EP11250502.

* cited by examiner

*Primary Examiner* — Tung S Lau
(74) *Attorney, Agent, or Firm* — Edwards Wildman Palmer LLP; Scott D. Wofsy; Joshua L. Jones

(57) ABSTRACT

A method for detecting angle sensor performance degradation in a flow angle measurement device in moving platform, such as aircraft and watercraft, as well as stationary platforms. Sensor dither in a flow angle measurement device is used to detect operational performance degradation of the sensor as a result of dynamic response changes caused by damaged or degraded mechanical components.

1 Claim, 4 Drawing Sheets

METHOD TO DETECT ANGLE SENSOR PERFORMANCE DEGRADATION THROUGH DITHER MONITORING

FIELD OF THE INVENTION

The present invention is directed to a method for detecting angle sensor performance degradation in a flow angle measurement device in moving vehicular platforms, as well as stationary platforms. More particularly, the present invention is directed to a computer system and method that utilizes movement of sensor dither in a flow angle measurement device to detect operational performance degradation as a result of dynamic response changes caused by damaged or degraded mechanical components of the sensor.

BACKGROUND OF THE INVENTION

Angle flow measurement devices, such as aircraft angle of attack and angle of sideslip measurement devices, are subject to degradation and damage resulting from a variety of sources, such as foreign object damage ("FOD"), internal electrical arcing provided by a lighting strike, environmental moisture effects, or incursion of foreign matter. These events, if undetected, can affect both the static and dynamic angular measurement accuracy of these devices.

Traditionally, these errors must be detected by manual inspection of the sensor or by comparison of the sensor to other sensors installed on the platform. In some platform applications, a major limitation of the existing method is that manual inspections can only be performed when the platform is on the ground, or otherwise not in use, and is performed only after a concern is identified by some other means. A sensor cross-comparison method, which might be used in operation, is usually able to detect only gross inaccuracies and may be susceptible to common mode issues. The present invention addresses these limitations by providing a means to detect degradation and damage within the device, while in use and on a regular basis, without the reliance on external monitoring.

SUMMARY OF THE INVENTION

In order to detect degradation and damage to angle flow measurement devices as discussed above, the present invention is directed to a computer system and method that utilizes the continuous movement of sensor dither in a flow angle measurement device to detect operational performance degradation due to the dynamic response change of damaged or degraded mechanical components.

In accordance with an illustrated embodiment, the invention provides a means to detect damage and/or degradation within a flow angle measurement sensor during normal operation, automatically and on a regular basis, without reliance on external monitoring. The present invention preferably utilizes real-time analysis of the dynamic characteristics of the angle sensor to detect damage and/or degradation. In contrast, the technology of the prior art relies on manual inspection or comparison to similar sensors installed on the platform.

In accordance with an illustrated embodiment, and in one aspect, the invention relates to a method for detecting angle sensor performance degradation in a flow angle measurement device including the steps of inputting current platform data and determining if the current platform data is within predetermined limits. If the current platform data is within predetermined limits, then a current vane angle on the angle sensor is detected and stored in a Vane Angle Array. Next, averages of the current platform environment are calculated, which preferably includes airspeed, altitude and temperature, to obtain a Velocity Data Array. A next step includes looking up corresponding values for Angle Filter Coefficients and a Dither Threshold based on the calculated averages of the current platform data and using Angle Filter Coefficients to filter the Vane Angle Array to calculate a Dither Array. Afterwards, a noise level value of the Dither Array is calculated wherein the noise level value is preferably a characteristic of vane output dither amplitude and frequency. A determination is then performed as to if the current vane operation exceeds the Dither Threshold based on the calculated noise level of the Dither Array. A fail output is then indicated if it is determined that the current vane operation exceeds the Dither Threshold or a pass output is indicated if it is determined that the current vane operation does not exceed the Dither Threshold.

BRIEF DESCRIPTION OF THE DRAWINGS

The objects and features of the invention can be understood with reference to the following detailed description of an illustrative embodiment of the present invention taken together in conjunction with the accompanying drawings in which.

WRITTEN DESCRIPTION OF CERTAIN EMBODIMENTS OF THE INVENTION

Figure 1:
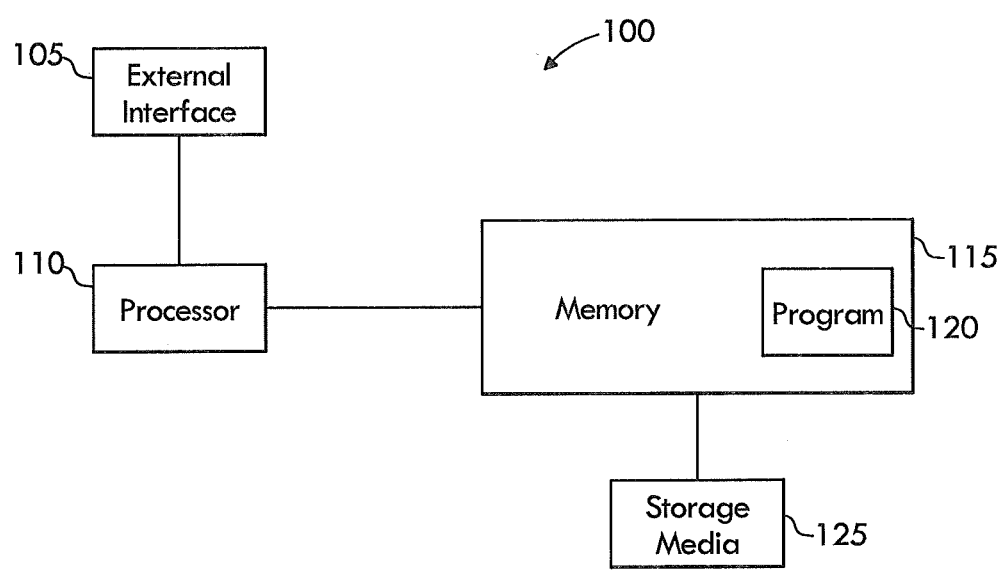
FIG. 1 is a block diagram of a computer system that can be used with certain embodiments of the invention.

The present invention is now described more fully with reference to the accompanying drawings, in which an illustrated embodiment of the invention is shown. The invention is not limited in any way to the illustrated embodiment as the illustrated embodiment described below is merely exemplary of the invention, which can be embodied in various forms, as appreciated by one skilled in the art. Therefore, it is to be understood that any structural and functional details disclosed herein are not to be interpreted as limiting the invention, but rather are provided as a representative embodiment for teaching one skilled in the art one or more ways to implement the invention. Furthermore, the terms and phrases used herein are not intended to be limiting, but rather are to provide an understandable description of the invention. Additionally like reference numerals are to be understood to refer to like elements.

It is to be appreciated that the embodiments of this invention as discussed below may be incorporated as a software algorithm, program or code residing in firmware and/or on computer useable medium (including software modules and browser plug-ins) having control logic for enabling execution on a computer system having a computer processor. Such a computer system typically includes memory storage configured to provide output from execution of the computer algorithm or program. It is also to be understood and appreciated the computer system may be located on a vehicle (e.g., an aircraft or watercraft) which has an angle sensor (e.g., an angle flow measurement device) which is the subject of the invention for detecting angle sensor performance degradation through dither monitoring. However, it is also to be understood and appreciated the aforesaid computer system may also be located external of the aforesaid vehicle.

An exemplary computer system is shown as a block diagram in FIG. 1 depicting computer system 100. Although system 100 is represented herein as a standalone system, it is not limited to such, but instead can be coupled to other computer systems via a network (not shown) or encompass other embodiments as mentioned below. System 100 preferably includes an external interface 105, a processor 110 (such as a digital data processor), and a memory 115. Memory 115 is a memory for storing data and instructions suitable for controlling the operation of processor 110.

An implementation of memory 115 can include a random access memory (RAM), a hard drive and a read only memory (ROM), or any of these components. One of the components stored in memory 115 is a program 120.

Program 120 includes instructions for controlling processor 110. Program 120 may be implemented as a single module or as a plurality of modules that operate in cooperation with one another. Program 120 is contemplated as representing a software embodiment of the method 200 described herein below.

External interface 105 can include an input device, such as a keyboard, touch screen, tablet, API web services interface, speech recognition subsystem or external communications network, for enabling a user to communicate information and command selections to processor 110. External interface 105 may also include an output device such as a display or a printer. In the case of a touch screen, the input and output functions are provided by the same structure. A cursor control such as a mouse, track-ball, or joy stick, allows the user to manipulate a cursor on the display for communicating additional information and command selections to processor 110. In contemplated alternative embodiments of the present invention, the program 120 can execute entirely without user input or other commands based on programmatic or automated access to a data signal flow through other systems that may or may not require a user interface for other reasons.

While program 120 is indicated as already loaded into memory 115, it may be configured on a storage media 125 for subsequent loading into memory 115. Storage media 125 can be any conventional storage media such as a magnetic tape, an optical storage media, a compact disc, a floppy disc, a silicon based memory storage device or the like. Alternatively, storage media 125 can be a random access memory, or other type of electronic storage, located on a remote storage system, such as a server that delivers the program 120 for installation and launch on a user device.

Figure 5:
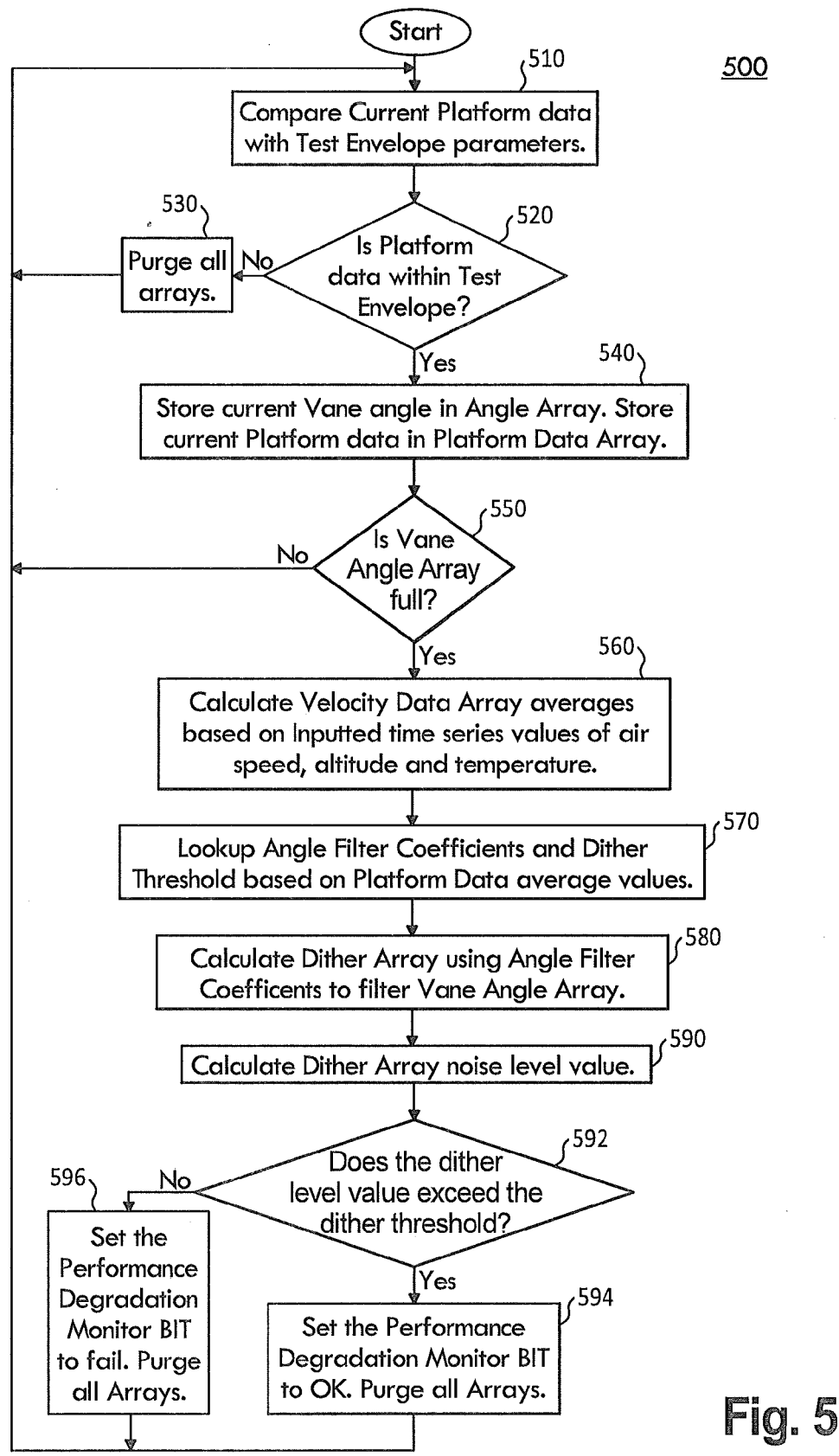
FIG. 5 is a flow chart depicting steps included in the computer method of the present invention for performing angular performance degradation detection.

The method 500 described herein has been indicated in connection with a flow diagram depicted in FIG. 5 for facilitating a general description of the principal processes of an illustrated embodiment of the invention; however, certain blocks can be invoked in an arbitrary order, such as when the events drive the program flow such as in an object-oriented program. Accordingly, the flow diagram is to be understood as an example flow and that the blocks can be invoked in a different order than as illustrated.

FIG. 1 is intended to provide a brief, general description of an illustrative and/or suitable exemplary environment in which embodiments of the below described present invention may be implemented. FIG. 1 is an example of a suitable environment and is not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

In the description that follows, certain embodiments may be described with reference to acts and symbolic representations of operations that are performed by one or more computing devices, such as the computing system environment 100 of FIG. 1. As such, it will be understood that such acts and operations, which are at times referred to as being computer-executed, include the manipulation by the processor of the computer of electrical signals representing data in a structured form. This manipulation transforms the data or maintains them at locations in the memory system of the computer, which reconfigures or otherwise alters the operation of the computer in a manner understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

Embodiments may be described in a general context of computer-executable instructions, such as program modules 120, being executed by a computer system 100. Generally, program modules 120 include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules 120 may be located in both local and remote computer storage media including memory storage devices.

Figure 2:
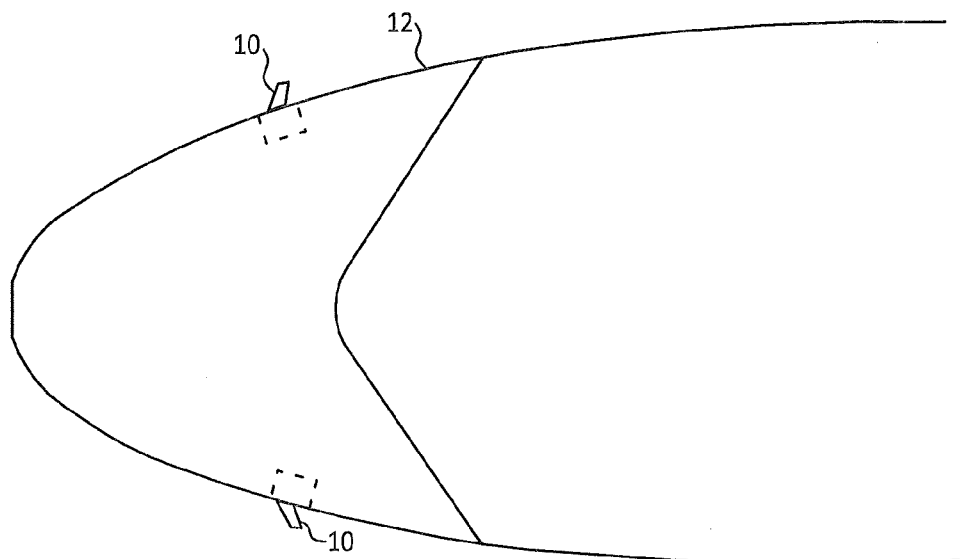
FIG. 2 is a top plan view of an aircraft nose showing the location of angle flow sensors installed on the sides of the fuselage in an illustrative embodiment of the invention.
Figure 3:
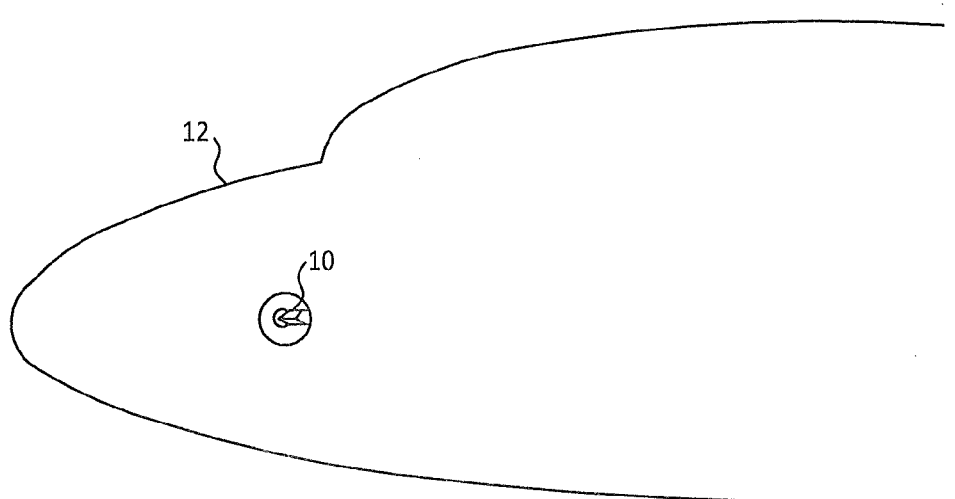
FIG. 3 is a side plan view of an aircraft nose showing the location of an angle flow sensor installed on the left side of the fuselage in an illustrative embodiment of the invention.

With the computer system 100 being described above, and in accordance with an illustrated embodiment, and with reference now to FIGS. 2-5, the present invention monitors the oscillation characteristics of an angular fluid flow measurement device 10. As best shown in FIGS. 2 and 3, angular fluid flow measurement device 10 is shown installed on either side of an aircraft nose 12. It is to be appreciated and understood, the present invention is not to be understood to be limited to such an angular fluid flow measurement device 10 but rather may encompass a variety of angle flow measurement devices for measuring parameters such as an aircraft angle of attack, and/or may encompass an angle of sideslip measurement device.

Figure 4:
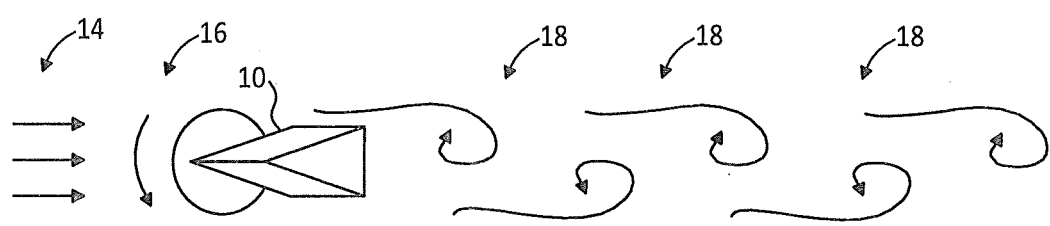
FIG. 4 is a vortex shedding diagram showing a top view of an angle flow sensor and airflow directions of the free incoming air stream and the vortex components during shedding in an illustrative embodiment of the invention.

The above mentioned oscillations which are to be monitored by the invention are commonly known as "dither", which are caused by vortex shedding of the portion of the angle sensor 10 exposed to the flow, as shown in FIG. 4. With reference to FIG. 4, arrows 14 indicate undisturbed free air flow; the arrow 16 shows the direction of oscillating motion caused by vortex shedding; and arrows 18 show a series of vortices that have been shed from the vane, also known as a "Karman Vortex Street". The dither is defined by the amplitude and frequency of the oscillations, and these characteristics are repeatable for specific operational conditions. By referencing the sensor dither characteristics the system and method of the present invention is able to determine if the sensor 10 is operating within normal limits.

It is to be understood the aforesaid referenced dither characteristic phenomenon is dependent upon the specific operating conditions for device 10. As a result of this dependency, a computer program algorithm preferably in the program module 120 of system 100 accepts the platform supplied operating data from device 10 as an input and determines what the appropriate acceptance criteria should be. The acceptance criteria levels are based on the detected dither level within the time based angle signal.

With reference now to FIG. 5, shown is a flow chart depicting computer implemented method 500 illustrating the steps of a computer program algorithm implemented in computer system 100 for detecting the angular flow degradation based on the vortex shedding caused by the dithering of the angle flow sensor 10 in accordance with an illustrated embodiment of the invention.

Starting at step 510, system 100 compares the current platform (e.g. aircraft) environment data (e.g. airspeed, altitude, temperature, angle of attack, roll rate, etc.) to predetermined and stored values ("Test Envelope") of these parameters to determine if performing a test for determining angle sensor performance degradation is necessary. Next, at step 520, the system preferably performs a decision to either continue with the detection algorithm (via program module 120) or to start over (step 510) based on the comparison made in step 510 in the event the platform data is not within the predetermined test envelope. Thus, in the event the decision in step 520 is determined a "no", then process flows to step 530 in which data stored from a prior loop (step 510 to 520), which data is no longer valid, is caused to be purged from system 100.

However, if the system determination in step 520 is a "yes", then process flows to step 540 in which the platform data referenced in step 510 is stored within an appropriate set of arrays (e.g, the current platform data is stored in the Platform Data Array and the current Vane Angle is stored in the Vane Angle Array, preferably in memory of system 100). It is to be understood and appreciated the Vane Angle Array is preferably a time series of detected vane angle values whereby when a sufficient number of data points are collected, the Vane Angle Array is considered full.

Next, process flows to step 550 in which system 100 determines if enough data is available to perform the evaluation of performance degradation. If "no", meaning the dataset is not complete, then the process of system 100 returns to Start to collect more data from preferably device 10. And if "yes", meaning the dataset for the Vane Angle Array is full and complete, process flows to step 560 in which system 100 calculates the averages of the current platform environment, the Velocity Data Array, based on inputted time series values of airspeed, altitude and temperature.

After the calculation of step 560 is performed by system 100, process flows to step 570 wherein based on the calculations determined in step 560, the process of system 100 performs a lookup of the corresponding values for the Angle Filter Coefficients and the Dither Threshold, preferably in a lookup table or similar component in system 100. It is to be understood and appreciated the Dither Threshold is the characterized noise level which determines if a vane is operating normally or abnormally whereby levels beyond the Dither Threshold are considered to be abnormal. It is further to be understood and appreciated that instead of looking up corresponding values for the Angle Filter Coefficients, a fixed filter, or similar means may be used.

Process in system 100 then proceeds to step 580 wherein based on the Angle Filter Coefficients determined in step 570, a selectable band pass filter is applied to the Vane Angle Array to calculate a Dither Array using Angle Filter Coefficients to filter the Vane Angle Array. Process then flows to the step 590 in which system 100 calculates the noise level value of the Dither Array. It is to be understood and appreciated the noise level value is a characteristic of the vane output dither amplitude and frequency.

Process then flows to step 592 in which system 100 determines if the current vane operation, as measured by noise level (the dither level value), is beyond the dither threshold using the Dither Threshold as determined in step 570. If "yes" then system 100 reports a failing output (step 594) which sets the Performance Degradation Monitor BIT to fail and preferably all data is then cleared and the aforesaid process returns to Start. And if "no" (the current vane operation, as measured by noise level (the dither level value) is not beyond the dither threshold) then system 100 reports a passing output (step 596) which sets the Performance Degradation Monitor BIT to a Pass condition and preferably data is then cleared and the aforesaid process returns to Start.

It is to be appreciated some of the advantages provided by the above described computer system and method of the invention include providing increased safety for the vehicle reliant upon a fluid flow angular measurement device due at least to a lower probability of undetected latent failure in such a fluid flow angular measurement device. Further a margin of increased safety for the aforesaid vehicle is also provided due to in operation fault detection rather than relying on non operational periods for assessment. Additionally, reduced maintenance costs are provided by obviating the need for a physical inspection by maintenance personnel after vehicle operation in potential damage inducing environments, such as convective weather, and also due to the need for fewer device removals and returns for devices having no performance degradation. It is also to be appreciated and understood the invention described in accordance with at least the illustrated embodiment may be employed in conjunction as a component of any freely moving device on a vehicle including devices used to detect angular flow of fluids other than air.

As used herein, the term "process" is meant to be synonymous with any code or program that can be in a processor of a host computer (e.g., system 100), regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth. Although illustrated embodiments of the present invention has been described, it should be understood that various changes, substitutions, and alterations can be made by one of ordinary skill in the art without departing from the scope of the present invention.

Those skilled in the art will readily recognize additional numerous adaptations and modifications which may be made to the present invention which fall within the scope of the present invention as defined in the claims. Moreover, it is intended that the scope of the present invention include all foreseeable equivalents to the elements, structures and method steps described with reference to the drawings. Accordingly, the invention is to be limited only by the scope of the claims and these equivalents.

What is claimed is:

1. A method for detecting angle sensor performance degradation in a flow angle measurement device, comprising the steps of:
   inputting current platform data and determining if said current platform data is within predetermined limits;
   if current platform data is within predetermined limits, then a current vane angle on the angle sensor is detected and stored in a Vane Angle Array;
   calculating averages of the current platform environment, which include at least one of the following parameters, airspeed, altitude or temperature, to obtain a Velocity Data Array, looking up corresponding values for Angle Filter Coefficients and a Dither Threshold based on the calculated averages of the current platform data and using Angle Filter Coefficients to filter the Vane Angle Array to calculate a Dither Array;
   calculating a noise level value of the Dither Array, where the noise level value is a characteristic of vane output dither amplitude and frequency;
   determining if the current vane operation exceeds the Dither Threshold based on the calculated noise level of the Dither Array;
   reporting by a processor a failing output if it is determined that the current vane operation exceeds the Dither Threshold; and
   reporting by a processor a passing output if it is determined that the current vane operation does not exceed the Dither Threshold.

* * * * *